US011362937B2

(12) United States Patent
She et al.

(10) Patent No.: US 11,362,937 B2
(45) Date of Patent: Jun. 14, 2022

(54) LOCATION-AWARE ROUTING FOR EAST-WEST DATA TRAFFIC

(71) Applicant: Cisco Technology, Inc., San Jose, CA (US)

(72) Inventors: Huimin She, Shanghai (CN); Lele Zhang, Shanghai (CN); Shiwei Gao, Shanghai (CN); Xiaoguang Jason Chen, San Jose, CA (US); Chuanwei Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 16/825,171

(22) Filed: Mar. 20, 2020

(65) Prior Publication Data

US 2021/0297342 A1    Sep. 23, 2021

(51) Int. Cl.
*G06F 15/173* (2006.01)
*H04L 45/00* (2022.01)
*H04L 41/0816* (2022.01)
*H04L 45/02* (2022.01)

(52) U.S. Cl.
CPC .......... *H04L 45/38* (2013.01); *H04L 41/0816* (2013.01); *H04L 45/02* (2013.01)

(58) Field of Classification Search
USPC .................. 709/238, 239, 242, 241; 370/392
See application file for complete search history.

(56) References Cited

U.S. PATENT DOCUMENTS

| 8,189,561 B2 * | 5/2012 | Karaoguz ............. H04W 40/10 370/351 |
| 10,103,970 B2 | 10/2018 | Dasgupta et al. |
| 2011/0228696 A1 | 9/2011 | Agarwal et al. |
| 2019/0132207 A1 | 5/2019 | Nataraj et al. |

OTHER PUBLICATIONS

Gao, Yue, "Performance and Appilcability of Candidate Routing Protocols for Smart Grid's Wireless Mesh Neighbor-Area Networks", semanticscholar.org, Department of Electrical & Computer Enginerring, McGill University, Montreal, Canada, Apr. 15, 2014, 76 pages.

(Continued)

*Primary Examiner* — Lan Dai T Truong
(74) *Attorney, Agent, or Firm* — Lee & Hayes, P.C.

(57) ABSTRACT

Techniques for utilizing Software-Defined Field-Area Network (SD-FAN) controllers to receive a geographic location and transmission power of individual nodes and generate a geographic location topology of a Field-Area Network (FAN) to provide nodes with location-aware route paths for data transmission. One or more SD-FAN controller(s) may maintain a geographic location database to store the geographic location and transmission power of the individual nodes. Each node may utilize a Destination Address Object to advertise its geographic location and transmission power to the SD-FAN controller. The SD-FAN controller(s) may utilize the geographic location table to generate the geographic location topology of the FAN and determine a location-aware route path for optimized data transmission between nodes in the FAN.

20 Claims, 8 Drawing Sheets

(56) References Cited

OTHER PUBLICATIONS

Sobral, Jose V. V. et al., "Routing Protocols for Low Power and Lossy Networks in Internet of Things Applications", May 9, 2019, retrieved from the internet at <<www.mdpi.com/journal/sensors>>, 40 pages.
PCT Search Report & Written Opinion dated Jul. 1, 2021.
Wu Jun et al: "NLES: A Novel Lifetime Extension Scheme for SafetyCritical Cyber-Physical Systems Using SON and NFV", IEEE Internet of Things Journal, IEEE, USA, vol. 6, No. 2, Apr. 1, 2019 (Apr. 1, 2019), pp. 2463-2475, XP011723563.

\* cited by examiner

600 ⇘

```
┌─────────────────────────────────────────────────────────────────────────────┐
│ GENERATE, BY A SOFTWARE-DEFINED-NETWORKING (SDN) CONTROLLER, A PHYSICAL     │
│ LOCATION TOPOLOGY OF A FIELD AREA NETWORK BASED AT LEAST IN PART ON A       │
│ LOCATION TABLE INDICATING PHYSICAL LOCATIONS OF INDIVIDUAL NODES IN THE     │
│ FIELD AREA NETWORK AND RESPECTIVE TRANSMISSION POWER OF THE INDIVIDUAL      │
│ NODES                                                                       │
│ 602                                                                         │
└─────────────────────────────────────────────────────────────────────────────┘
                                      │
                                      ▼
┌─────────────────────────────────────────────────────────────────────────────┐
│ RECEIVE, AT THE SDN CONTROLLER AND FROM A FIRST NODE IN THE FIELD AREA      │
│ NETWORK, A QUERY REQUESTING A ROUTE PATH TO TRANSMIT DATA FROM THE FIRST    │
│ NODE TO A SECOND NODE IN THE FIELD AREA NETWORK                             │
│ 604                                                                         │
└─────────────────────────────────────────────────────────────────────────────┘
                                      │
                                      ▼
┌─────────────────────────────────────────────────────────────────────────────┐
│ DETERMINE, BY THE SDN CONTROLLER, THE ROUTE PATH FROM THE FIRST NODE TO     │
│ THE SECOND NODE BASED AT LEAST IN PART ON THE PHYSICAL LOCATION TOPOLOGY    │
│ OF THE FIELD AREA NETWORK                                                   │
│ 606                                                                         │
└─────────────────────────────────────────────────────────────────────────────┘
                                      │
                                      ▼
┌─────────────────────────────────────────────────────────────────────────────┐
│ SEND, FROM THE SDN CONTROLLER AND TO THE FIRST NODE, THE ROUTE PATH         │
│ 608                                                                         │
└─────────────────────────────────────────────────────────────────────────────┘
```

FIG. 6

LOCATION-AWARE ROUTING FOR EAST-WEST DATA TRAFFIC

TECHNICAL FIELD

The present disclosure relates generally to communicating a geographic location and transmission power of individual nodes to generate a geographic location topology of a Field-Area Network and determine location-aware route paths for data traffic.

BACKGROUND

Communications networks, such as wireless mesh networks, and so on, are used to connect a variety of different devices. These communication networks often contain specialized devices and may be implemented to support smart utility and/or smart city applications, such as, for example, Advanced Metering Infrastructure (AMI), Distribution Automation (DA), Demand Response (DR), smart street lighting control, and the like. These communication networks may be implemented as a low power network, such as, for example, a Field-Area Network (FAN) to manage control traffic (for network management) and data traffic (for customer applications). Standards have been developed for low power networks, such as low-power and lossy networks (LLNs), which are a class of network in which the network devices operate under various constraints (e.g., constraints on processing power, memory, battery power, etc.)

Network protocols have been implemented for LLNs, such as the IPv6 Routing Protocol for Low-Power and Lossy Networks (RPL). Like many protocols, RPL has various communication requirements by which network devices must abide. For example, nodes in LLNs may communicate according to routing tables which may comprise indications of downward routes and/or upward routes. In traditional FANs, control traffic (for network management) and data traffic (for customer applications) share the same routing path and may compete for wireless resources causing bottlenecks in the network. Additionally, FAN parameters are static, in that all nodes in the network share the same pre-configured parameters and cannot be dynamically updated to adaptively optimize network performance. Thus, separate FANs are generally deployed for different applications (e.g., AMI, DA, DR, etc.) to meet specified requirements on bandwidth, throughput, latency, and the like. While utilizing LLNs, such as a FAN, may be effective for supporting smart utility and/or smart city applications, the constraints of the network may lead to various inefficiencies, such as, for example, interference between nodes in the network, broken routing paths and/or temporarily unavailable links between nodes, and power consumption concerns for nodes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for a Software-Defined Field-Area Network (SD-FAN) controller to generate a geographic location topology of the FAN and determine location-aware route paths to facilitate communications between nodes in the FAN.

DESCRIPTION OF EXAMPLE EMBODIMENTS

Overview

Figure 1A:
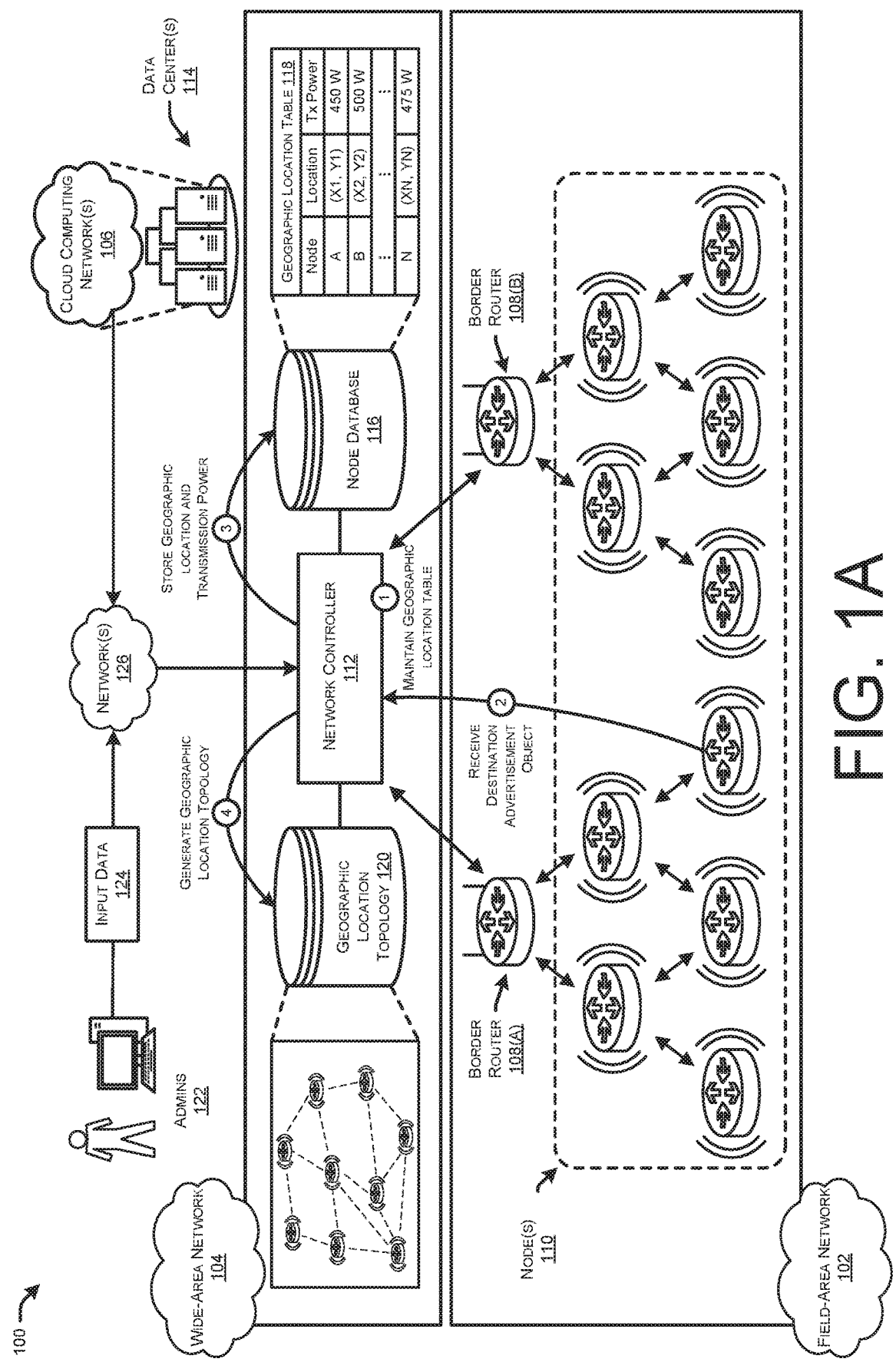
FIG. 1A illustrates a system-architecture diagram of an example flow for a field-area network controller to maintain a geographic location table of individual nodes in the field-area network and determine a geographic location topology for the individual nodes in the network.

This disclosure describes a method of utilizing Software-Defined Field-Area Network (SD-FAN) controllers to receive a geographic location and transmission power of individual nodes and generate a geographic location topology of the FAN to provide nodes with location-aware route paths for data transmission. The method includes maintaining, by a Software-Defined-Networking (SDN) controller associated with a field-area network, a geographic location table. The geographic location table may include one or more mappings between geographic locations of individual nodes in the field-area network and respective transmission power of the individual nodes. The method may further include receiving, at the SDN controller, a destination advertisement object including a geographic location of the node and a transmission power of the node. The method may further include storing, in the geographic location table, a mapping between the geographic location of the node and the transmission power of the node. The method may further include generating, by the SDN controller, a geographic location topology of the field-area network based at least in part on the geographic location table.

Additionally, or alternatively, the method includes determining, by a node in a field-area network, a geographic location of the node. The method may further include determining, by the node, a transmission power of the node.

The transmission power may indicate a transmission range of the node. The method may further include generating, by the node, a destination advertisement object including the geographic location of the node and the transmission power of the node. The method may further include sending, to an SDN controller associated with the field-area network, the destination advertisement message.

Additionally, or alternatively, the method includes generating, by an SDN controller, a geographic location topology of a field-area network based at least in part on a geographic location table indicating geographic locations of individual nodes in the field-area network and respective transmission power of the individual nodes. The method may further include receiving, at the SDN controller and from a first node in the field-area network, a query requesting a route path to transmit data from the first node to a second node in a field-area network. The method may further include determining, by the SDN controller, the route path from the first node to the second node based at least in part on the geographic location topology of the field-area network. The method may further include sending, from the SDN controller and to the first node, the route path.

Additionally, the techniques described herein may be performed by a system and/or device having non-transitory computer-readable media storing computer-executable instructions that, when executed by one or more processors, performs the method described above.

Example Embodiments

As discussed above, communication networks may be governed by standards or protocols which specify communication requirements for network devices. While these communication requirements support the execution of various types of applications utilizing LLNs, the constraints of these communication networks may lead to various inefficiencies, such as, for example, interference between nodes in the network, broken routing paths and/or temporarily unavailable links between nodes, and power consumption concerns for individual nodes.

This disclosure describes techniques for Software-Defined-Networking (SDN) controllers to manage Field-Area Networks (FANs), also referred to as SD-FAN controller(s), by obtaining geographic locations and respective transmission power of individual nodes in the FAN to generate a geographic location topology of the FAN. Further, the SD-FAN controller may handle requests, or queries, from nodes in the network requesting a route path to transmit data to a specified node and may utilize the geographic location topology to determine and provide a requesting node with a location-aware route path for transmitting data to the specified node. According to the techniques and mechanisms described herein, each FAN may have one or more border router(s) that are communicatively coupled to one or more endpoint(s), or node(s). The border router(s) may be communicatively coupled to one or more SD-FAN controller(s) associated with a Wide-Area Network (WAN) that is utilized to facilitate management of a respective FAN. In some examples, the SD-FAN controller(s) may include a computing component configured to handle computation intensive tasks (e.g., network parameter optimization, routing path optimization, etc.) and execute various Artificial Intelligence (AI) and/or Machine Learning (ML) algorithms.

Additionally, or alternatively, the SD-FAN controller(s) may be communicatively coupled to an SD-FAN Edge Computing Engine (ECE) configured to handle computation intensive tasks (e.g., network parameter optimization, routing path optimization, etc.) and execute various AI and/or ML algorithms. The techniques and mechanisms described herein may be implemented with the SD-FAN controller and/or the SD-FAN ECE, such that the desired implementation does not limit the techniques and mechanisms described herein.

The FAN may utilize the IPv6 Routing Protocol for Low-Power and Lossy Networks (RPL). Further, RPL may organize the FAN topology as a Directed Acyclic Graph (DAG) that may be partitioned into one or more Destination Oriented DAGs (DODAG). In some examples, nodes in the FAN may utilize a Destination Advertisement Object (DAO) to propagate destination information upward along the DODAG. In some examples, the nodes in the network may utilize optional bits included in the DAO, for example, DODAG identification (DODAGID) bits, to insert a geographic location of the node (e.g., Longitude and Latitude) and a transmission power of the wireless radio associated with the node.

The SD-FAN controller may be configured to maintain a geographic location table of the FAN. In some examples, the geographic location table may include one or more mappings between geographic locations of individual nodes in the FAN and respective transmission power of the individual nodes. In some examples the geographic location of a node may be represented as longitudinal and/or latitudinal coordinates, an indication from the Global Positioning System (GPS), or any indication of a geographic location with respect to other nodes 110 In some examples, the geographic location table may be stored in a node database that is communicatively coupled to the SD-FAN controller. Additionally, or alternatively, the SD-FAN controller may be configured to communicate with an SD-FAN ECE that is configured to maintain the geographic location table and/or node database of the FAN. In some examples, the SD-FAN controller may utilize the geographic location table to generate a geographic topology of the FAN. In some examples, the geographic location topology of the FAN may provide, for each individual node in the FAN, an indication of which nodes the individual node can directly communicate with (i.e., two nodes within transmission range of one another). For example, the SD-FAN controller may utilize the geographic location of a node and the transmission power of the node to determine a transmission range of the wireless radio associated with the node. When a first node is within transmission range of a second node, a transmission link is provided in the geographic location topology.

In some examples, each node in the FAN may utilize the DAO to report its geographic location to a respective border router, which may pass the DAO along to a respective SD-FAN controller. Additionally, or alternatively, each node in the FAN may include the transmission power of the node in the DAO. When the SD-FAN controller receives the DAO, the SD-FAN controller may store a mapping between the geographic location and the transmission power of the node in the geographic location table. In some examples, node(s) in the FAN may periodically send a DAO to the SD-FAN controller to account for changes in geographic location and/or transmission power to maintain accuracy of the geographic location table. The SD-FAN controller may then generate a geographic location topology of the network to update the previous geographic location topology of the FAN.

A node may query the network controller to receive a route path to a specified destination node. In some examples, the route path may be location-aware, such that the data transmission may take the lowest number of hops to reach the destination node. For example, the SD-FAN controller may receive a query from a node in the FAN specifying a destination node. The node may send the query to a respective border router, which may transmit the query to the SD-FAN controller. The SD-FAN controller may then query the geographic location topology and determine a location-aware route path from the source node to the destination node. In some examples, the location-aware route path may be a least-hop route path. In some examples, the location-aware route path may be a direct connection from the source node to the destination node, with no intermediate nodes. Additionally, or alternatively, the location-aware route path may comprise one or more intermediate nodes forming the location-aware route path from the source node to the destination node. The SD-FAN controller may then send the location-aware route path back to the border router where the location-aware route path is then forwarded to the source node. The source node may then utilize the location-aware route path for data transmission to the destination node.

In some examples, the source node may determine that a packet transmission utilizing the location-aware route path has failed. The source node may attempt to send the packet again utilizing the location-aware route path. In some examples, the source node may determine that the packet transmission has failed utilizing the location-aware route path a threshold number of times. For example, the source node may determine that the packet transmission has failed 3 times and may determine that 3 failed attempts is sufficient to satisfy the threshold number of times. The threshold number of failed transmission attempts may be any number 1-N, where N may be any integer greater than 1. When the source node has determined that the packet transmission has failed utilizing the location-aware route path the threshold number of times, the source node may send a message to the SD-FAN controller indicating the failure of the location-aware route path. Additionally, or alternatively, the source node may send the message to the respective border router in the FAN, and the border router may forward the message to the SD-FAN controller. The SD-FAN controller may then remove the link(s) in the geographic location topology along the location-aware route path. For example, if the location-aware route path was a direct connection from the source node to the destination node, the SD-FAN controller may remove the direct link from the source node to the destination node from the geographic location topology. Additionally, or alternatively, if the location-aware route path was comprised of one or more intermediate nodes forming the route path from the source node to the destination node, the SD-FAN controller may remove all of the links between nodes in the location-aware route path. Additionally, or alternatively, the message may include an indication of the link in the location-aware route path in which the packet transmission failed and may remove only the link indicated by the message.

The geographic location topology may provide a number of indications to the SD-FAN controller. In some examples, the geographic location topology may provide an indication that a node in the network has a number of direct connections that satisfies or exceeds a threshold number of direct connections.

For example, the geographic location topology may indicate that a particular node in the FAN has 7 direct connections to other nodes in the FAN. The SD-FAN controller may determine that 7 direct connections exceeds a threshold number of direct connections, where the threshold number of direct connections is any number from 1-N, where N is any integer greater than 1. The SD-FAN controller may then send a message to the node instructing the node to reduce the radio transmission power, thus reducing the transmission range of the wireless radio of the node such that the number of direct connections to other nodes no longer exceeds the threshold number of direct connections. In some examples, the SD-FAN controller may specify a transmission power value that the node should reduce to. Additionally, or alternatively, the SD-FAN controller may communicate back and forth with the node to adjust the transmission power by a fixed amount each time until the number of direct connections is reduced to or below the threshold number of direct connections.

Additionally, or alternatively, the geographic location topology may indicate that a particular node in the FAN does not have any direct connections to other nodes in the FAN. The SD-FAN controller may then send a message to the node instructing the node to increase the radio the radio transmission power, thus increasing the transmission range of the wireless radio of the node such that the number of direct connections to other nodes in the FAN are established. In some examples, the SD-FAN controller may specify a transmission power value that the node should increase to. Additionally, or alternatively, the SD-FAN controller may communicate back and forth with the node to adjust the transmission power by a fixed amount each time until the number of direct connections is increased to or exceeds a threshold number of direct connections, where the threshold number of direct connections is any number from 1-N, where N is any integer greater than 1.

As described herein, a node can generally include any type of computing resource with at least one memory and/or processor. Further, although the techniques described as being implemented in a field-area network, the techniques are generally applicable for any network of devices managed by any entity where computing resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to routing data traffic between nodes in a field-area network. For instance, the techniques described herein may provide nodes with location-aware route paths for packet transmission, allowing for nodes to utilize routes with the least number of hops to a destination, thus reducing packet loss in low-power and lossy networks. By maintaining a geographic location table of nodes in a field-area network indicating a geographic location and transmission power for individual nodes, the SD-FAN controller may generate a geographic location topology of the network. The geographic location topology of the FAN provides location-aware route paths for a node to transmit a packet to the most geographically proximal node in the FAN, which was not previously possible. Additionally, the SD-FAN controller may adjust transmission power of the nodes in the network to manage the number of direct connections to other nodes, thus reducing interference between nodes in the FAN, and completely remove links between nodes in the geographic location topology, which was also not previously possible.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example flow for communicating destination advertisement objects indicating a geographic location and transmission power of individual nodes to generate a geographic location topology of a Field-Area Network (FAN) 102. The FAN may be in communication with one or more Wide-Area Network(s) (WAN) 104 and/or one or more cloud computing networks 106, such that one or more components and/or devices of the FAN 102 may be communicatively coupled to one or more components and/or devices of the WAN 104. In some examples, the FAN may comprise various networking components, such as, one or more border router(s) 108 and/or one or more node(s) 110. In some examples, the WAN may comprise one or more network controller(s) 112. In some examples, the one or more network controller(s) may be supported by various computing devices included in the cloud computing network 106 and may be communicatively coupled to the one or more border router(s) 108. In some examples, the cloud computing network 106 may comprise one or more data center(s) 114 that may be located across geographic areas, and the cloud computing network 106 may be a distributed network through which users (often customers and/or admins) may interact via user devices to manage or otherwise interact with utilities, services, and/or applications provided by the FAN 102 and/or the WAN 104.

In some examples, the network controller(s) 112 may include a computing component configured to handle computation intensive tasks (e.g., network parameter optimization, routing path optimization, etc.) and execute various Artificial Intelligence (AI) and/or Machine Learning (ML) algorithms. Additionally, or alternatively, the network controller(s) 112 may be communicatively coupled to an Edge Computing Device (ECE) configured to handle the computation intensive tasks and execute the various AI and/or ML algorithms. In some examples, the network controllers may include an allocated virtual memory configured as a node database 116. In some examples, the node database 116 may include a geographic location table 118. In some examples, the allocated virtual memory may be configured to store a geographic location topology 120 of the FAN.

Administrative users 122 may provide input data 124 via the network(s) 126 to interact with the service and/or utility that is supported by the applications running on the nodes 110. For example, the admins 122 may employ nodes 110 in the FAN 102 to submit requests to process data, retrieve data, store data, and so forth to support the utility applications executing on the nodes 110.

A network controller 112 may be configured to maintain a geographic location table 118 of the FAN 102. In some examples, the geographic location table 118 may include one or more mappings between geographic locations of individual nodes 110 in the FAN 102 and respective transmission power of the individual nodes 110. In some examples, the geographic location table 118 may be stored in the node database 116 that is communicatively coupled to the network controller 112. Additionally, or alternatively, the network controller 112 may be configured to communicate with a SD-FAN ECE that is configured to maintain the geographic location table 118 and/or node database 116 of the FAN 102. In some examples, the network controller 112 may utilize the geographic location table 118 to generate a geographic topology 120 of the FAN 102. In some examples, the geographic location topology 120 of the FAN 102 may provide, for each individual node 110, an indication of which nodes 110 the individual node 110 can directly communicate with (i.e., two nodes 110 within transmission range of one another). For example, the network controller 112 may utilize the geographic location of a node 110 and the transmission power of the node to determine a transmission range of the wireless radio associated with the node 110. When a first node 110 is within transmission range of a second node 110, a transmission link is provided in the geographic location topology 120.

In some examples, each node 110 in the FAN 102 may utilize the DAO to report its geographic location to a respective border router 108, which may pass the DAO along to a respective network controller 112. Additionally, or alternatively, each node 110 in the FAN may include the transmission power of the node 110 in the DAO. When the network controller 112 receives the DAO, the network controller 112 may store a mapping between the geographic location and the transmission power of the node 110 in the geographic location table 118. In some examples, node(s) 110 in the FAN 102 may periodically send a DAO to the network controller 112 to account for changes in geographic location and/or transmission power to maintain accuracy of the geographic location table. The network controller 112 may then generate a geographic location topology 120 of the FAN 102 to update the previous geographic location topology 120 of the FAN 102.

At "1," the network controller 112 may maintain a geographic location table 118 of the FAN 102. In some examples, the geographic location table 118 is stored in a node database 116 attached to the network controller 112. The geographic location table 118 may include a mapping for each node in the FAN 102, indicating the geographic location and transmission power of a node 110. In some examples, when the geographic location and/or transmission power of a node 110 is changed, these changes may be populated through the geographic location table 118.

At "2," the network controller 112 may receive a DAO from a node 110 in the FAN 102. In some examples, the DAO may include the geographic location of the node and the transmission power of the node. In some examples, the node 110 may determine its geographic location. Additionally, or alternatively, the node 110 may determine its transmission power, which may indicate a transmission range of a wireless radio associated with the node 110. In some examples, the node 110 may utilize the geographic location and transmission power to generate the DAO prior to sending the DAO to the network controller 112 through the border router 108(A).

At "3," the network controller 112 may store a mapping between the geographic location of the node 110 and the transmission power of the node 110 in the geographic location table 118. In some examples, the mapping may replace a previous mapping of the node 110 stored in the geographic location table 118.

At "4," the network controller 112 may utilize the geographic location table 118 to generate a geographic location topology 120 of the FAN 102. In some examples, the geographic location topology 120 may be periodically generated such that the geographic location topology 120 remains updated as nodes 110 change geographic location and/or transmission power.

Figure 1B:
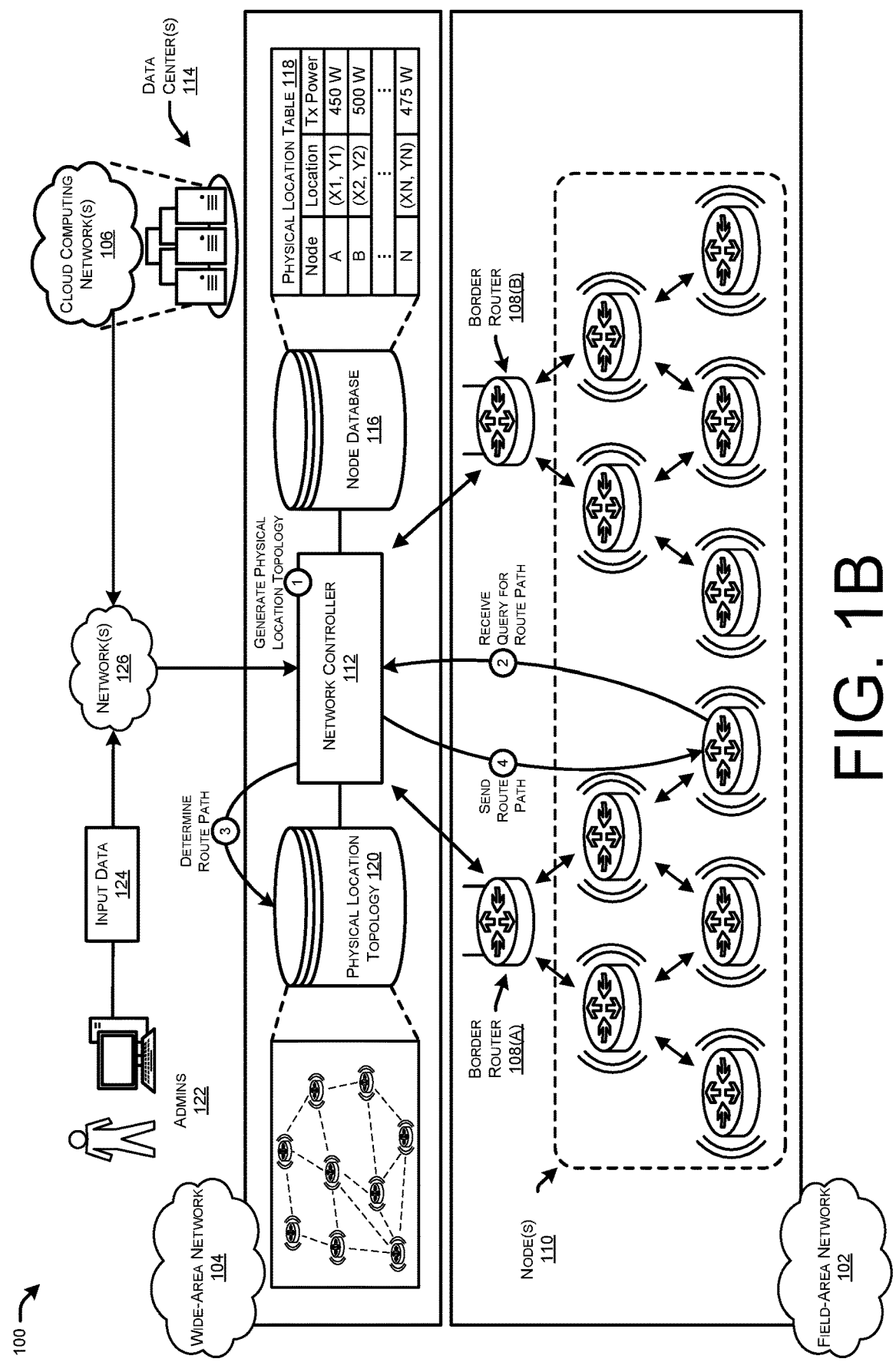
FIG. 1B illustrates a system-architecture diagram of an example flow for a field-area network controller to determine a geographic location topology for individual nodes in the network and configure a location-aware route path for a requesting node to transmit packet(s) to a destination node.
Figure 2A:
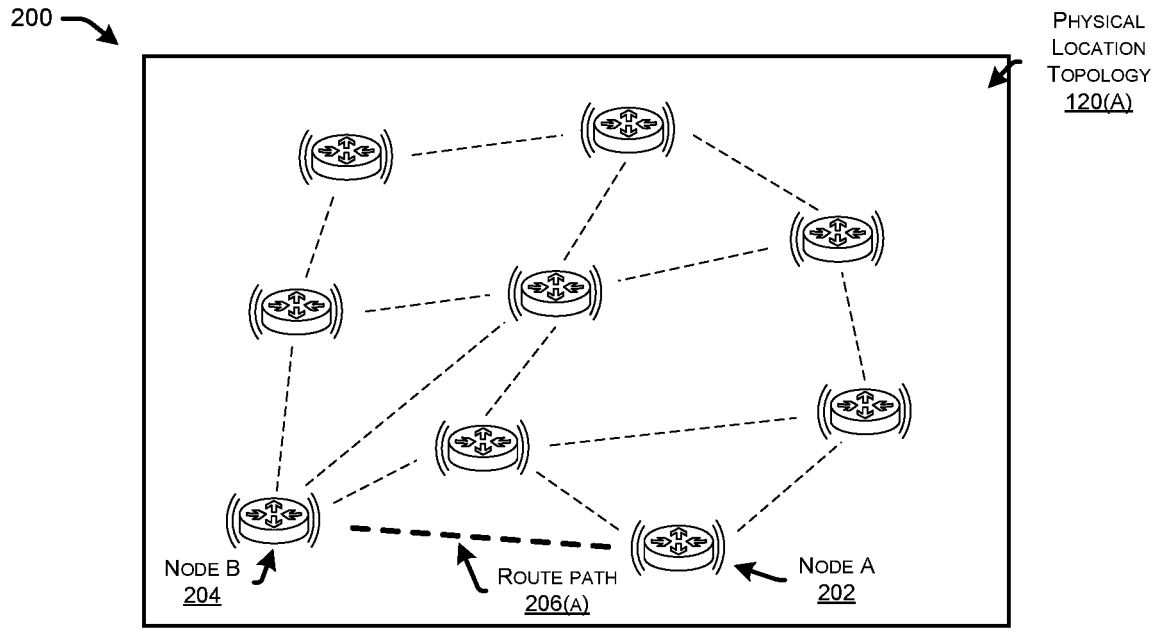
FIG. 2A illustrates a diagram of a geographic location topology of an example field-area network and a location-aware route path directly connecting two nodes.
Figure 2B:
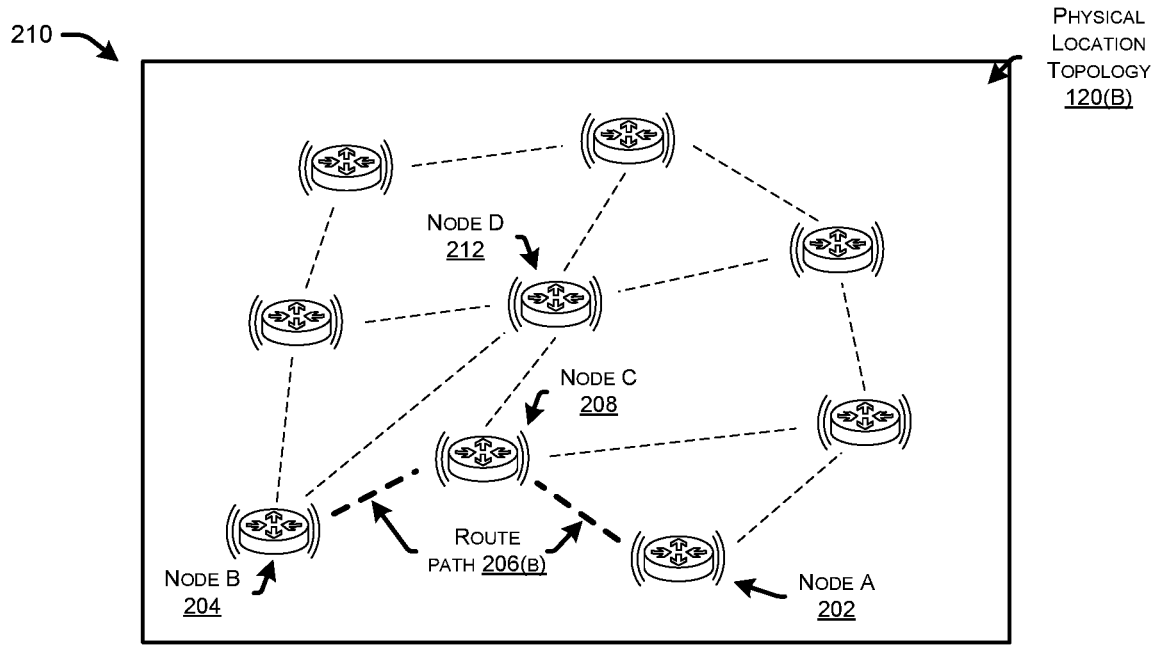
FIG. 2B illustrates a diagram of a geographic location topology of an example field-area network and a location-aware route path utilizing an intermediate node to connect two nodes.

In some examples, the example flow may continue from step "4" of FIG. 1A to step "5" of FIG. 2B. Additionally, or alternatively, the example flow illustrated in FIG. 1B may begin from step "5" of FIG. 1B and continue to step "7" of FIG. 1B.

FIG. 1B illustrates a system-architecture diagram 200 of an example flow for a field-area network controller 112 to determine a geographic location topology 118 for individual node(s) 112 in the network 102 and configure a location-aware route path for a requesting node 112 to transmit packet(s) to a destination node 112.

In some examples, the network controller 112 may handle requests, or queries, from nodes 110 in the FAN 102 requesting a route path to transmit data to a specified node 110 and may utilize the geographic location topology 120 to determine and provide a requesting node 110 with a location-aware route path for transmitting data to the specified node 110.

For example, a node 110 may query the network controller 112 to receive a route path to a specified destination node 110. In some examples, the route path may be location-aware, such that the data transmission may take the lowest number of hops to reach the destination node 110. For example, the network controller 112 may receive a query from a node 110 in the FAN 102 specifying a destination node 110. The node 110 may send the query to a respective border router 108, which may transmit the query to the network controller 112. The network controller 112 may then query the geographic location topology 120 and determine a location-aware route path from the source node 110 to the destination node 110. In some examples, the location-aware route path may be a least-hop route path. In some examples, the location-aware route path may be a direct connection from the source node 110 to the destination node 110, with no intermediate nodes 110. Additionally, or alternatively, the location-aware route path may comprise one or more intermediate nodes 110 forming the location-aware route path from the source node 110 to the destination node 110. The network controller 112 may then send the location-aware route path back to the border router 108 where the location-aware route path is then forwarded to the source node 110. The source node 110 may then utilize the location-aware route path for data transmission to the destination node 110.

At "5," the network controller 112 may receive a query from a first node 110 in the FAN 102. In some examples, the query may include a request for a route path to transmit data from the first node 110 to a second node 110 in the FAN 102. As described above, the route path may be comprised of any number of nodes 110 in the FAN 102.

At "6," the network controller 112 may utilize the geographic location topology 120 to determine a location-aware route path from the first node 110 to the second node 110. In some examples, there may be one or more route paths from the first node 110 to the second node 110. In some examples, the network controller 112 may utilize the SD-FAN ECE to determine, from the one or more route path, the location-aware route path. In some examples, the location-aware route path may be the route path with the least hops from the first node 110 to the second node 110.

At "7," the network controller 112 may send the location-aware route path to the first node 110. In some examples, the network controller 112 may send the location-aware route path to a border router 108(A) that may forward the location-aware route path to the first node 110.

FIG. 2A illustrates a diagram 200 of a geographic location topology 120(A) of an example field-area network 102 and a location-aware route path 206(A) directly connecting two nodes 202, 204.

As described above with respect to FIGS. 1 and 2, a network controller 112 may be configured to maintain a geographic location table 118 of the FAN 102. In some examples, the network controller 112 may utilize the geographic location table 118 to generate a first geographic topology 120(A) of the FAN 102. The geographic location topology 120(A) of the FAN 102 may provide, for each individual node 202, 204, an indication of which nodes an individual node can directly communicate with (i.e., two nodes 202, 204 within transmission range of one another). In some examples, the network controller 112 may utilize the geographic location of a node and the transmission power of the node to determine a transmission range of the wireless radio associated with the node. For example, when node A 202 is within transmission range of node B 204, a route path 206(A) may be determined in the geographic location topology 120(A).

In some examples, the network controller 112 may receive a query from Node A 202 requesting a location-aware route path to Node B 204. The network controller 112 may then utilize the geographic location topology 120(A) and determine that the route path 206(A) connects Node A 202 to Node B 204. The network controller 112 may then provide Node A 202 with the location-aware route path 206(A) to Node B 204.

In some examples, Node A 202 may determine that a packet transmission utilizing the location-aware route path 206(A) has failed. Node A 202 may attempt to send the packet again utilizing the location-aware route path 206(A). In some examples, Node A 202 may determine that the packet transmission has failed utilizing the location-aware route path 206(A) a threshold number of times. For example, Node A 202 may determine that the packet transmission has failed 3 times and may determine that 3 failed attempts is sufficient to satisfy the threshold number of times. The threshold number of failed transmission attempts may be any number 1-N, where N may be any integer greater than 1. When Node A 202 has determined that the packet transmission has failed utilizing the location-aware route path 206(A) the threshold number of times, Node A 202 may send a message to the network controller 112 indicating the failure of the location-aware route path 206(A). Additionally, or alternatively, Node A 202 may send the message to the respective border router 108 in the FAN 102, and the border router 108 may forward the message to the network controller 112. The network controller 112 may then remove the link(s) in the first geographic location topology 120(A) along the location-aware route path 206(A). For example, if the location-aware route path 206(A) was a direct connection from Node A 202 to Node B 204, the network controller 112 may remove the direct link from Node A 202 to Node B 204 from the geographic location topology 120(A).

In some examples, the network controller 112 may then determine a new location-aware route path from Node A 202 to Node B 204. Additionally, or alternatively, the network controller 112 may update the geographic location table 118 and generate a new geographic location topology of the FAN. In some examples, FIG. 2A may be a first step in an example flow to FIG. 2B.

FIG. 2B illustrates a diagram 210 of a geographic location topology 120(B) of an example field-area network 102 and a location-aware route path 206(B) utilizing an intermediate node 208 to connect two nodes 202, 204.

In some examples, the network controller 112 may determine a location-aware route path 206(B) for transmitting packets from Node A 202 to Node B 202 utilizing Node C 208 as a bridge, or an intermediate node. Additionally, or alternatively, the network controller 112 may receive an indication from Node A 202 that the location-aware route path 206(A), provided above with respect to FIG. 2A, has failed to transmit a packet to Node B 204 the threshold number of times. In some examples, the network controller 112 may update the first geographic location topology 120(A) to remove the first location-aware route path 206(A) and establish a new location-aware route path 206(B) to connect Node A 202 to Node B 204 utilizing the intermediate Node C 208, shown by the new geographic location topology 120(B). Additionally, or alternatively, if the first location-aware route path 206(A) was comprised of one or more intermediate nodes forming the first route path from Node A 202 to Node B 204, the network controller 112 may remove all of the links between nodes in the location-aware-route path. Additionally, or alternatively, the message may include an indication of the link in the location-aware route path 206(A) in which the packet transmission failed and may remove only the link indicated by the message. Additionally, or alternatively, the new location-aware route path 206(B) may include any number of nodes in the FAN 102.

Additionally, the geographic location topology 120 may provide a number of indications to the network controller 112. In some examples, the geographic location topology 120 may provide an indication that a node in the FAN 102 has a number of direct connections that satisfies or exceeds a threshold number of direct connections.

For example, the geographic location topology 120(B) may indicate that Node D 212 in the FAN has 5 direct connections to other nodes in the FAN. The network controller 112 may determine that 5 direct connections exceeds a threshold number of direct connections, where the threshold number of direct connections is any number from 1-N, where N is any integer greater than 1. The network controller 112 may then send a message to Node D 212 instructing the node to reduce the radio transmission power, thus reducing the transmission range of the wireless radio of the node such that the number of direct connections to other nodes no longer exceeds the threshold number of direct connections. In some examples, the network controller 112 may specify a transmission power value that Node D 212 should reduce to. Additionally, or alternatively, the network controller 112 may communicate back and forth with Node D 212 to adjust the transmission power by a fixed amount each time until the number of direct connections is reduced to or below the threshold number of direct connections.

Additionally, or alternatively, the geographic location topology 120(B) may indicate that a particular node in the FAN does not have any direct connections to other nodes in the FAN. The network controller 112 may then send a message to the node instructing the node to increase the radio the radio transmission power, thus increasing the transmission range of the wireless radio of the node such that the number of direct connections to other nodes in the FAN are established. In some examples, the network controller 112 may specify a transmission power value that the node should increase to. Additionally, or alternatively, the network controller 112 may communicate back and forth with the node to adjust the transmission power by a fixed amount each time until the number of direct connections is increased to or exceeds a threshold number of direct connections, where the threshold number of direct connections is any number from 1-N, where N is any integer greater than 1.

Figure 3:
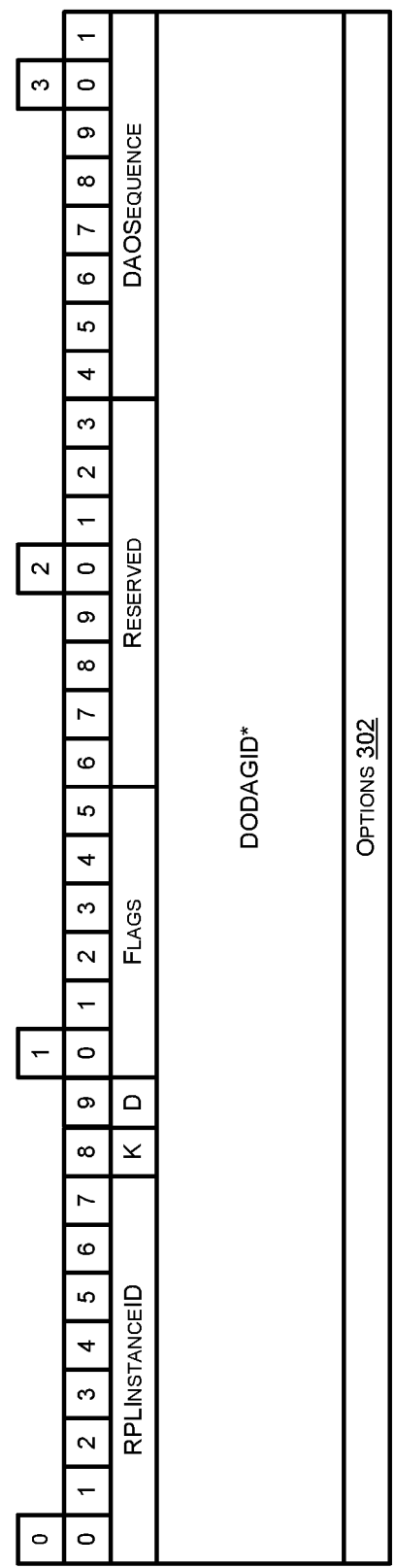
FIG. 3 illustrates a diagram of an example Destination Advertisement Object (DAO) packet header including the geographic location and transmission power of a node.

FIG. 3 illustrates a diagram 300 of an example Destination Advertisement Object (DAO) packet header including options bits 302. In some examples, the geographic location 304 and transmission power 306 of a node may be included in the options bits 302. The geographic location 304 and transmission power 306 of the node may include the same or similar attributes as described with respect to FIGS. 1-3.

In some examples, the FAN 102 may utilize the IPv6 Routing Protocol for Low-Power and Lossy Networks (RPL). Further, RPL may organize the FAN 102 topology as a Directed Acyclic Graph (DAG) that may be partitioned into one or more Destination Oriented DAGs (DODAG). In some examples, nodes in the FAN 102 may utilize a Destination Advertisement Object (DAO) to propagate destination information upward along the DODAG. In some examples, the nodes in the network may utilize optional bits 302 included in the DAO, for example, DODAG identification (DODAGID) bits, to insert a geographic location 304 of the node (e.g., Longitude and Latitude) and a transmission power 306 of the wireless radio associated with the node.

Figure 4:
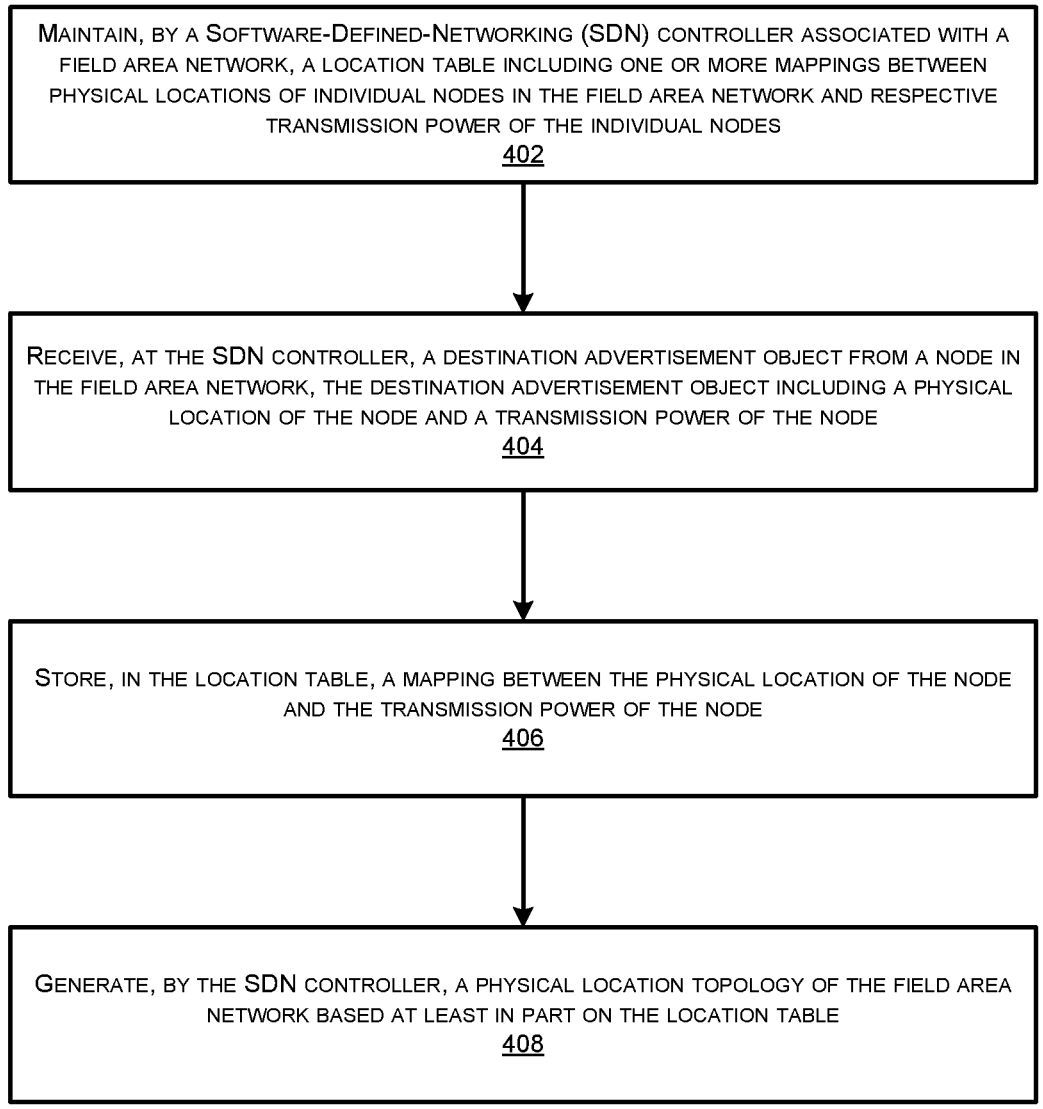
FIG. 4 illustrates a flow diagram of an example method for a Software-Defined Field-Area Network (SD-FAN) controller to receive a geographic location and a transmission power from individual nodes in the FAN and generate a geographic location topology of the network.
Figure 5:
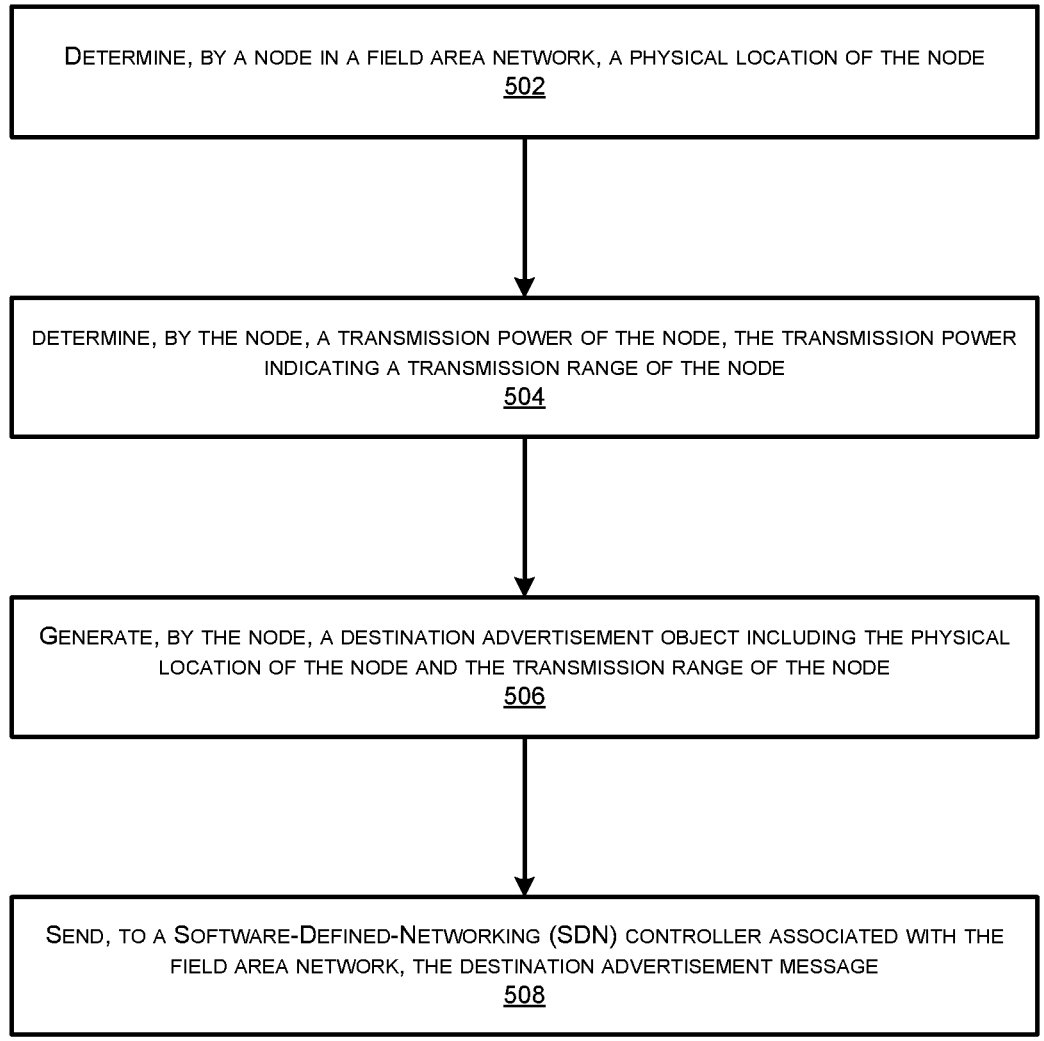
FIG. 5 illustrates a flow diagram of an example method for a node to determine its geographic location and transmission power in a Field-Area Network (SD-FAN) and generate a Destination Advertisement Object to transmit the geographic location and transmission power to a network controller associated with the FAN.

FIGS. 4-6 illustrate flow diagrams of example methods 400, 500, and 600 and that illustrate aspects of the functions performed at least partly by the Field-Area Network 102, Wide-Area Network 104, and/or cloud computing network 106 as described in FIGS. 1-3. The logical operations described herein with respect to FIGS. 4-6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4-6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a Software-Defined Field-Area Network (SD-FAN) controller 112 to receive a geographic location and a transmission power from individual nodes 110 in a FAN 102 and generate a geographic location topology 120 of the FAN 102.

At 402, a SD-FAN controller 112 associated with a FAN 102 may maintain a geographic location table 118 including one or more mappings between geographic locations of nodes 110 of the FAN and respective transmission power capabilities of individual ones of the nodes 110.

At 404, the SD-FAN controller 112 may receive a destination address object from a node 110 in the FAN 102. In some examples, the destination advertisement object may include a geographic location of the node 110. Additionally, or alternatively, the destination advertisement object may include a transmission power capability of a wireless radio associated with the node 110. In some examples, the transmission power may indicate a transmission range of the wireless radio associated with the node 110.

At 406, the SD-FAN controller 112 may generate a geographic location topology 120 of the FAN 102. In some examples, the geographic location topology 120 may be generated based at least in part on the geographic location table 118. Additionally, or alternatively, the geographic location topology 120 may be generated based at least in part on the geographic location and the transmission power capability of the node 110. In some examples, the geographic location topology 120 may be indicative of communication paths through the field area network 102 based at least in part on geographic locations of the nodes 110 and transmission power capabilities of the nodes 110.

FIG. 5 illustrates a flow diagram of an example method 500 for a node 110 to determine its geographic location and transmission power in a FAN 102 and generate a Destination Advertisement Object to transmit the geographic location and transmission power to a network controller 112 associated with the FAN 102.

At 502, a node 110 in the FAN 102 may determine its geographic location. In some examples the geographic location may be represented as longitudinal and/or latitudinal coordinates, an indication from the Global Positioning System (GPS), or any indication of a geographic location with respect to other nodes 110.

At 504, the node 110 in the FAN 102 may determine its transmission power. In some examples, the transmission power may include the transmission power of a wireless transmission radio associated with the node 110. In some examples, the transmission power may indicate a transmission range of the wireless transmission radio associated with the node 110.

At 506, the node 110 in the FAN 102 may generate a destination advertisement object including the geographic location of the node 110 and the transmission power of the node 110. In some examples, the destination advertisement object may include any number of characteristics included in the destination advertisement object described with respect to FIG. 3.

At 508, the node 110 in the FAN 102 may send the destination advertisement object to a SD-FAN controller 112 associated with the FAN 102. In some examples, the node 110 may send the destination advertisement object to a respective border router 108 and the border router 108 may forward the destination advertisement object to the SD-FAN controller 112.

FIG. 6 illustrates a flow diagram of an example method 600 for a SD-FAN controller 112 to generate a geographic location topology 120 of the FAN 102 and determine location-aware route paths to facilitate communications between nodes 110 in the FAN 102.

At 602, a SD-FAN controller 112 may generate a geographic location topology 120 of the FAN 102. In some examples, the geographic location topology 120 may be generated based at least in part on a geographic location table 118 including one or more mappings between geographic locations of individual nodes 110 in the FAN and respective transmission power of the individual nodes 110.

At 604, the SD-FAN controller 112 may receive, from a first node in the FAN 102, a query requesting a route path to transmit data from the first node to a second node in the FAN 102.

At 606, the SD-FAN controller 112 may determine the route path from the first node to the second node based at least in part on the geographic location topology 120 of the FAN 102. In some examples, the route path may include route path 206(A) and/or 206(B) as described with respect to FIGS. 2A and 2B.

At 608, the SD-FAN controller 112 may send the route path to the first node.

Figure 7:
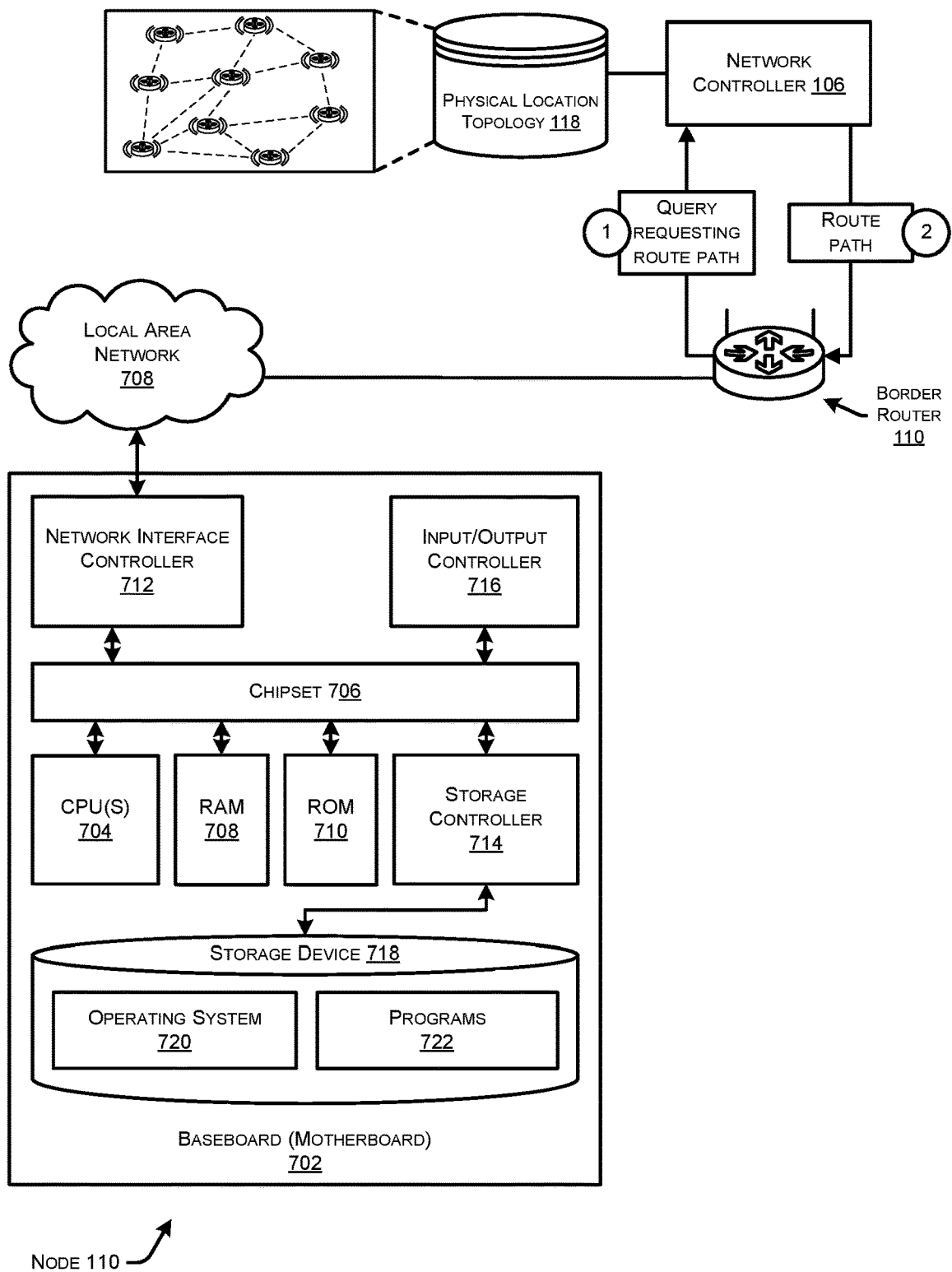
FIG. 7 is a computer architecture diagram showing an illustrative computer hardware architecture for implementing a server device (or node) that can be utilized to implement aspects of the various technologies presented herein.

FIG. 7 shows an example computer architecture for a computing device (or node) 110 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 110 may, in some examples, correspond to a physical server 114 described herein.

The computing device 110 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 110.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 110. The chipset 706 can further provide an interface to a computer-readable storage medium such as a read-only memory ("ROM") 710 or non-volatile RAM ("NVRAM") for storing basic routines that help to startup the computing device 110 and to transfer information between the various components and devices. The ROM 710 or NVRAM can also store other software components necessary for the operation of the computing device 110 in accordance with the configurations described herein.

The computer 702 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computing device 110 to other computing devices over the network 608 (or 126). It should be appreciated that multiple NICs 712 can be present in the computing device 110, connecting the computer to other types of networks and remote computer systems.

The computing device 110 can be connected to a storage device 718 that provides non-volatile storage for the computer. The storage device 718 can store an operating system 720, programs 722, and data, which have been described in greater detail herein. The storage device 718 can be connected to the computing device 110 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA")

interface, a fiber channel ("FC") interface, or other type of interface for physically connecting and transferring data between computers and physical storage units.

The computing device 110 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 110 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 110 can further read information from the storage device 718 by detecting the physical states or characteristics of one or more particular locations within the physical storage units.

In addition to the mass storage device 718 described above, the computing device 110 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 110. In some examples, the operations performed by the cloud computing network 102, and or any components included therein, may be supported by one or more devices similar to computing device 110. Stated otherwise, some or all of the operations performed by the cloud computing network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 110. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computing device 110.

In one embodiment, the storage device 718 or other computer-readable storage media is encoded with computer-executable instructions which, when loaded into the computing device 110, transform the computer from a general-purpose computing system into a special-purpose computer capable of implementing the embodiments described herein. These computer-executable instructions transform the computing device 110 by specifying how the CPUs 704 transition between states, as described above. According to one embodiment, the computing device 110 has access to computer-readable storage media storing computer-executable instructions which, when executed by the computing device 110, perform the various processes described above with regard to FIGS. 1-6. The computing device 110 can also include computer-readable storage media having instructions stored thereupon for performing any of the other computer-implemented operations described herein.

The computing device 110 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 110 might not include all of the components shown in FIG. 7, can include other components that are not explicitly shown in FIG. 7, or might utilize an architecture completely different than that shown in FIG. 7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A system comprising:
one or more processors; and
one or more computer-readable media storing computer-executable instructions that, when executed by the one or more processors, cause the one or more processors to perform operations comprising:
maintaining, by a Software-Defined-Networking (SDN) controller associated with a field area network, a geographic location table including one or more mappings between geographic locations of nodes of the field area network and respective transmission power capabilities of individual ones of the nodes;
receiving, at the SDN controller, a destination advertisement object from a node of the nodes in the field area network, the destination advertisement object including an indication of a geographic location of the node and a transmission power capability of the node; and generating, by the SDN controller and based at least in part on the geographic location and the transmission power capability of the node, a geographic location topology of the field area network, the geographic location topology being indicative of communication paths through the field area network based at least in part on geographic locations of the nodes and transmission power capabilities of the nodes.

2. The system of claim 1, wherein the geographic location topology includes the geographic location of the node with respect to the geographic locations of the nodes of the field area network.

3. The system of claim 1, the operations further comprising:

receiving, at the SDN controller and from the node, a query requesting a communication path to transmit data from the node to an additional node of the field area network;

determining, by the SDN controller, the communication path from the node to the additional node based at least in part on the geographic location topology of the field area network; and sending, from the SDN controller to the node, the communication path.

4. The system of claim 3, the operations further comprising:

receiving, at the SDN controller and from the node, an indication that the communication path has failed a threshold number of times; and updating, by the SDN controller, the geographic location topology to remove the communication path.

5. The system of claim 1, the operations further comprising:

sending, from the SDN controller and to the node, an instruction to adjust a transmission power of the node; and updating, by the SDN controller, the geographic location topology based at least in part on the instruction to adjust the transmission power of the node.

6. The system of claim 5, the operations further comprising:

identifying, by the SDN controller, a number of direct neighbor nodes associated with the node;

determining, by the SDN controller, that the number of direct neighbor nodes associated with the node satisfies a threshold number of direct neighbor nodes; and wherein sending the instruction to adjust the transmission power of the node is based at least in part on determining that the number of direct neighbor nodes associated with the node satisfies the threshold number of direct neighbor nodes.

7. The system of claim 5, the operations further comprising:

determining, by the SDN controller, that the transmission power of the node satisfies a threshold transmission power; and wherein sending the instruction to adjust the transmission power of the node is based at least in part on determining that the transmission power of the node satisfies the threshold transmission power.

8. A method comprising:

determining, by a node of a field area network, a geographic location of the node;

determining, by the node, a transmission power of the node, the transmission power indicating a transmission range of the node;

generating, by the node, a destination advertisement object including an indication of the geographic location of the node and the transmission power of the node; and sending, to a Software-Defined-Networking (SDN) controller associated with the field area network, the destination advertisement object.

9. The method of claim 8, further comprising:

sending, to the SDN controller, a query requesting a communication path to an additional node of the field area network; and receiving, from the SDN controller, the communication path.

10. The method of claim 9, further comprising:

determining, by the node, that the communication path has failed a threshold number of times; and sending, to the SDN controller, an indication that the communication path has failed the threshold number of times.

11. The method of claim 8, further comprising:

receiving, from the SDN controller, an instruction to adjust the transmission power;

adjusting, by the node, the transmission power to an adjusted transmission power; and sending, to the SDN controller, an indication of the adjusted transmission power.

12. The method of claim 8, further comprising determining, by the node, a number of connections to one or more additional nodes of the field area network.

13. The method of claim 12, further comprising:

determining, by the node, the number of connections to the one or more additional nodes is below a threshold number of connections; and sending, to the SDN controller, an indication that the number of connections to the one or more additional nodes is below the threshold number of connections.

14. The method of claim 12, further comprising:

determining, by the node, the number of connections to the one or more additional nodes exceeds a threshold number of connections; and sending, to the SDN controller, an indication that the number of connections to the one or more additional nodes exceeds the threshold number of connections.

15. A method comprising:

generating, by a Software-Defined-Networking (SDN) controller, a geographic location topology of a field area network based at least in part on a geographic location table indicating geographic locations of nodes of the field area network and respective transmission power capabilities of individual ones of the nodes, the geographic location topology being indicative of communication paths through the field area network;

receiving, at the SDN controller and from a first node of the field area network, a query requesting a communication path from the first node to a second node of the field area network;

determining, by the SDN controller, the communication path from the first node to the second node based at least in part on the geographic location topology of the field area network; and sending, from the SDN controller and to the first node, the communication path.

16. The method of claim 15, further comprising:
receiving, at the SDN controller and from the first node, an indication that the communication path has failed to transmit data a threshold number of times; and
updating, by the SDN controller, the geographic location topology to remove the communication path.

17. The method of claim 15, wherein the geographic location topology includes a first geographic location of the first node with respect to a second geographic location of the second node.

18. The method of claim 15, further comprising:
determining, by the SDN controller and based at least in part on the geographic location topology, that a transmission power of the first node satisfies a threshold transmission power;
sending, from the SDN controller and to the first node, an instruction to adjust the transmission power of the first node; and
updating, by the SDN controller, the geographic location topology based at least in part on the instruction to adjust the transmission power of the first node.

19. The method of claim 15, further comprising:
determining, by the SDN controller, a transmission range of the first node based at least in part on a transmission power associated with the first node, indicated by the geographic location table; and
determining, by the SDN controller, a number of nodes within the transmission range of the first node, based at least in part on the geographic location topology.

20. The method of claim 19, further comprising:
determining, by the SDN controller, that the number of nodes within the transmission range of the first node satisfies a threshold number of nodes within the transmission range of the first node; and
sending, from the SDN controller and to the first node, an instruction to adjust the transmission power of the first node; and
updating, by the SDN controller, the geographic location topology based at least in part on the instruction to adjust the transmission power of the first node.

* * * * *